Oct. 5, 1937.    E. B. GELLATLY    2,094,789
CONVEYER FLIGHT
Filed July 12, 1934    6 Sheets-Sheet 1
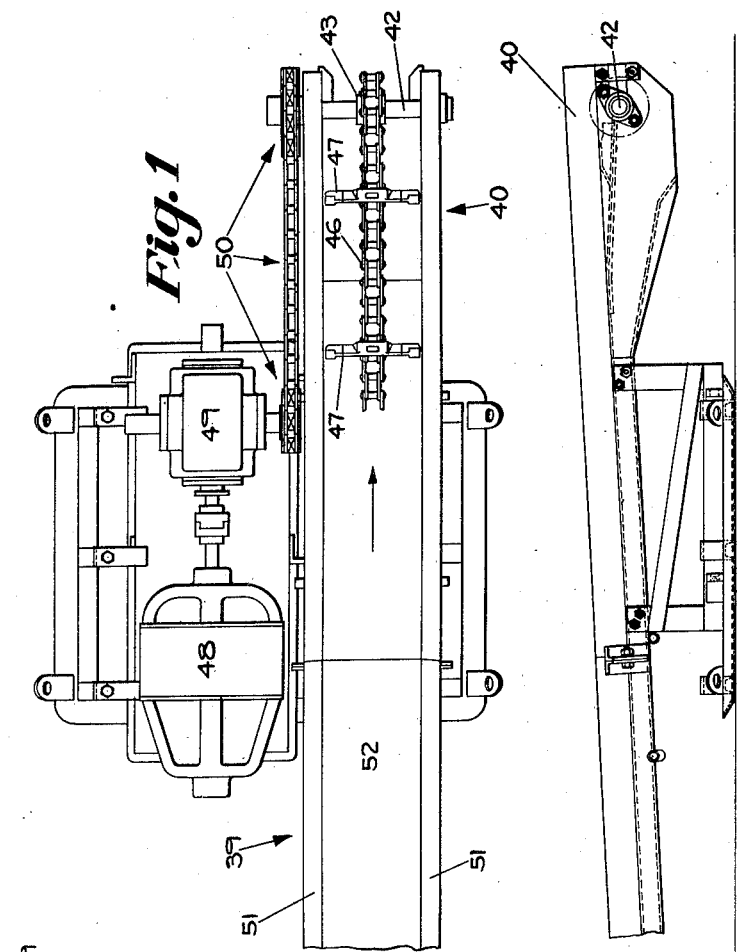
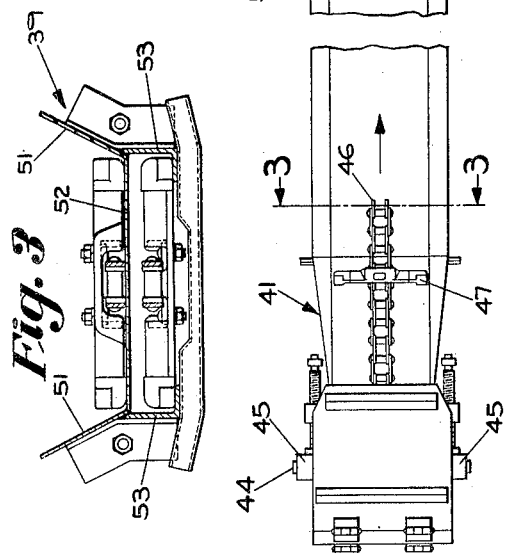
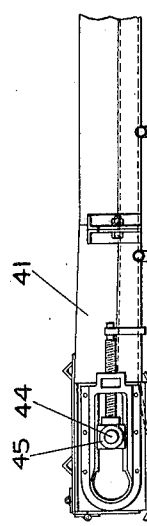
INVENTOR:
Edwin B. Gellatly,
By
Chas. M. Nissen,
ATTY.

Oct. 5, 1937.  E. B. GELLATLY  2,094,789
CONVEYER FLIGHT
Filed July 12, 1934   6 Sheets-Sheet 2
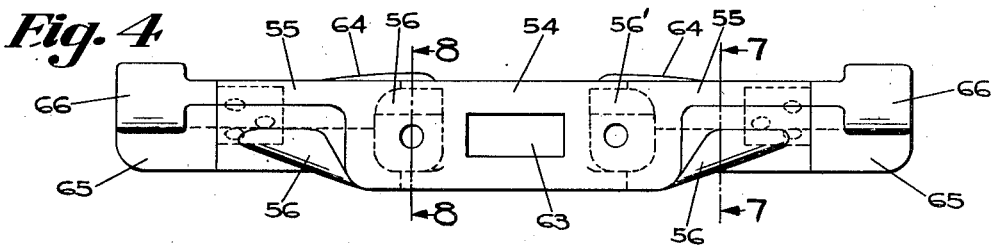
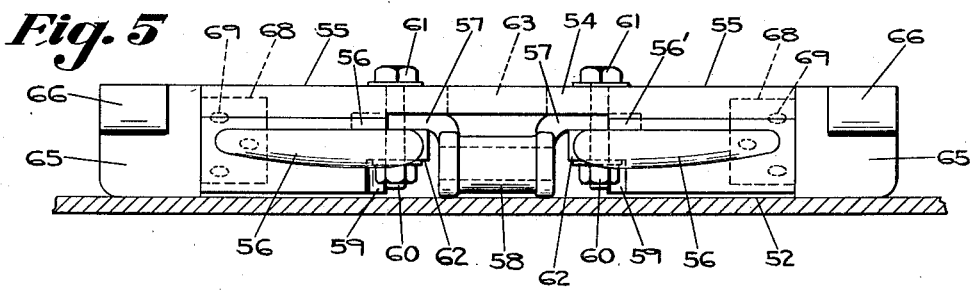
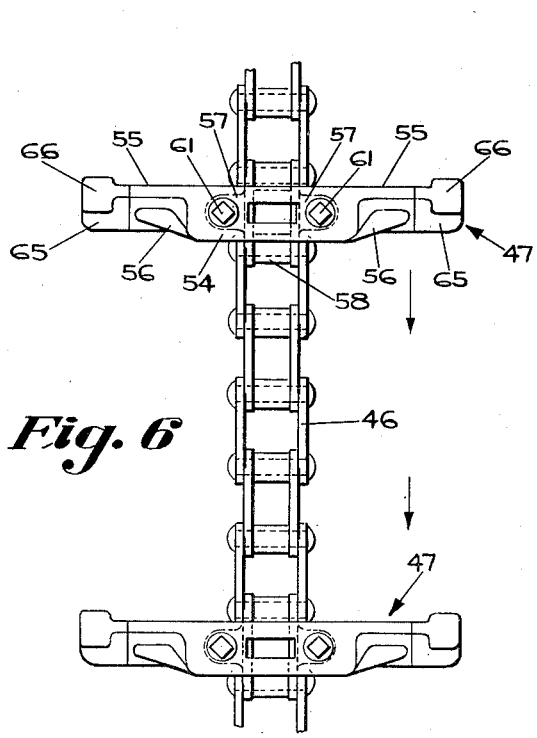
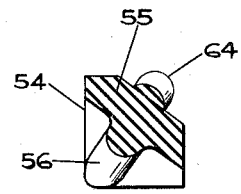
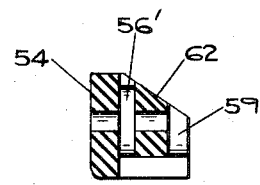
INVENTOR:
Edwin B. Gellatly,
BY
Chas. M. Nissen,
ATTY.

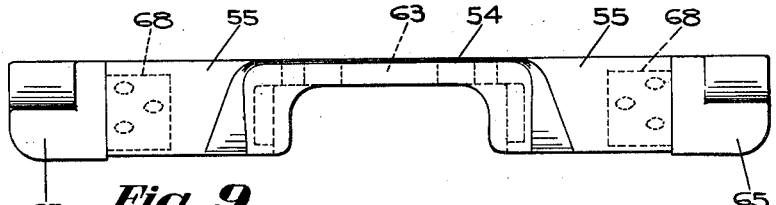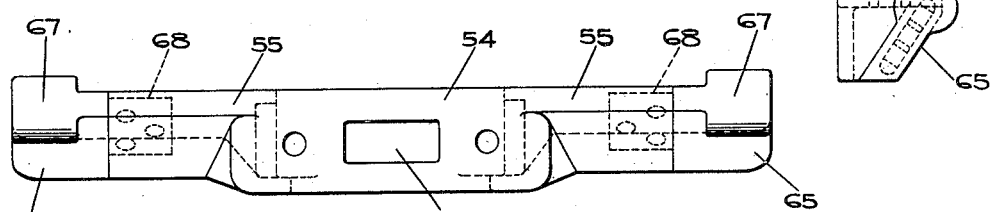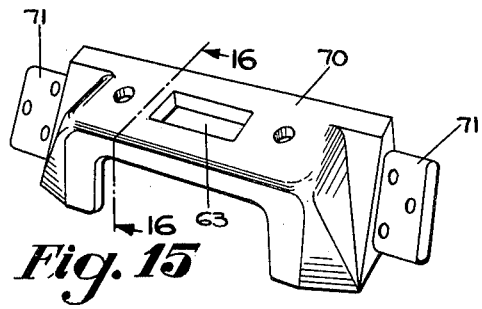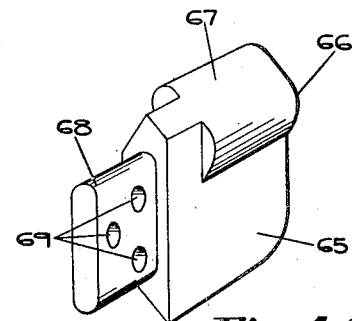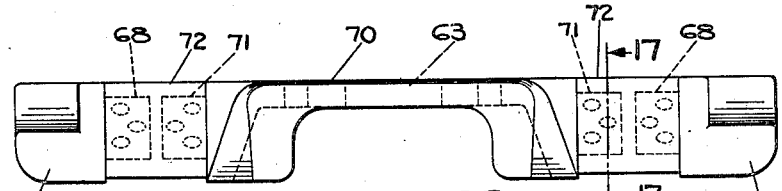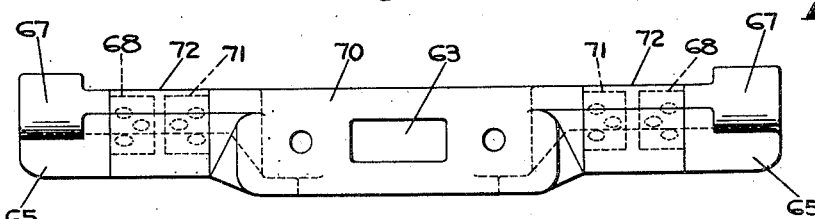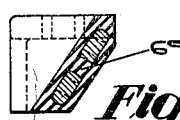

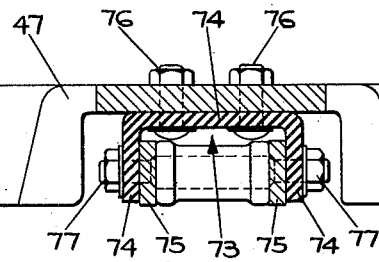
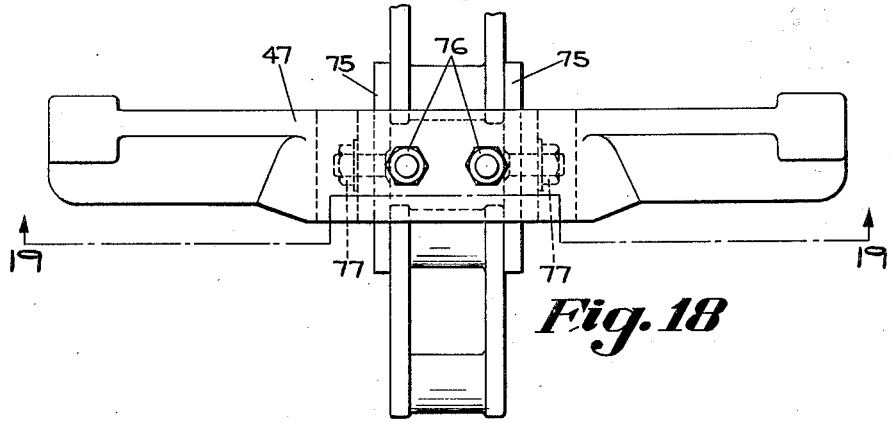
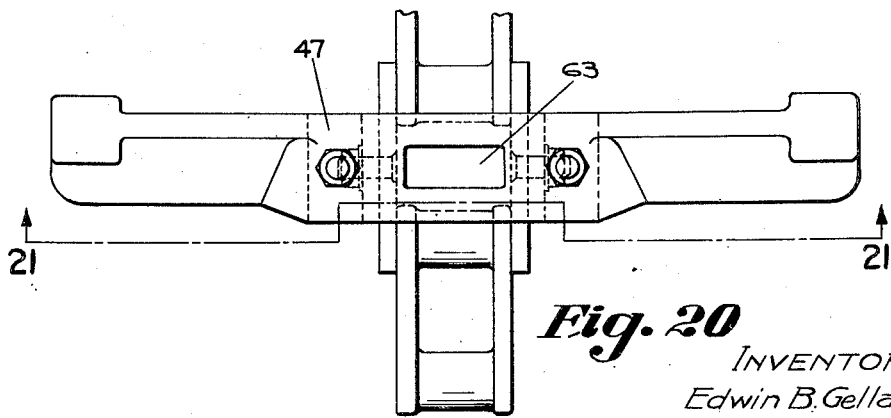

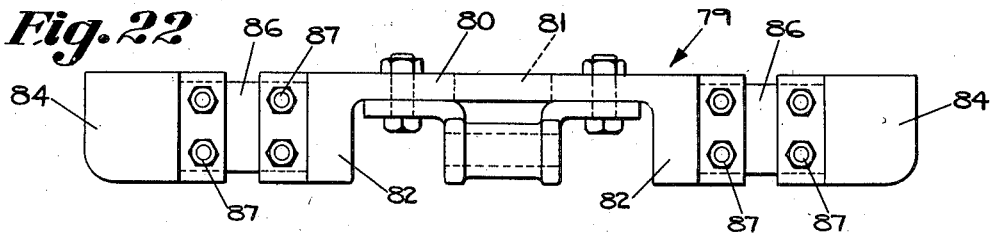
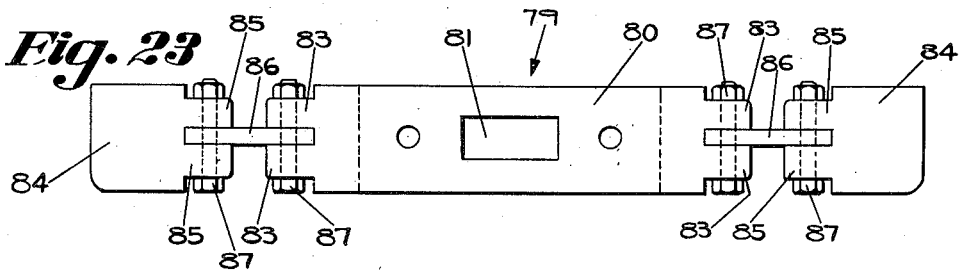
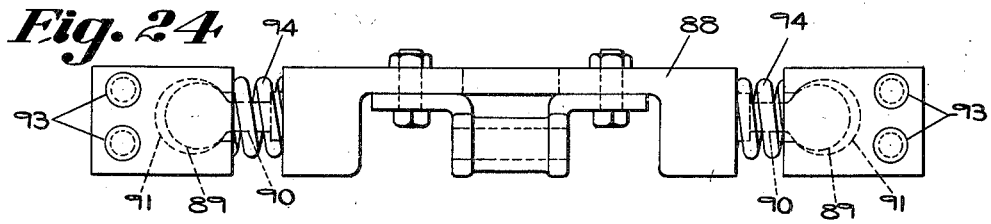
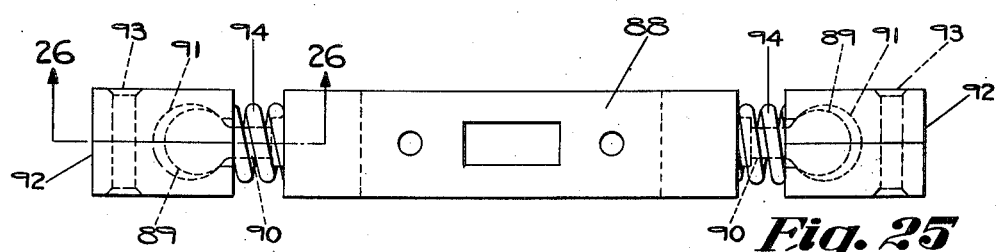
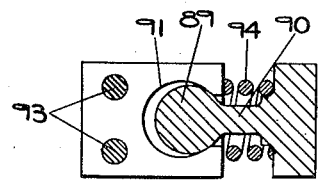

Oct. 5, 1937.    E. B. GELLATLY    2,094,789
CONVEYER FLIGHT
Filed July 12, 1934        6 Sheets-Sheet 6
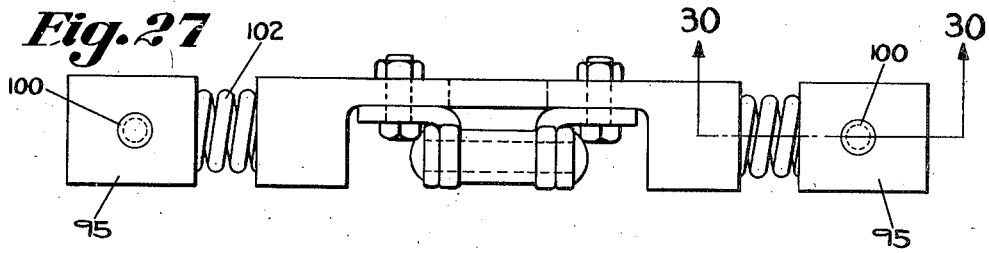
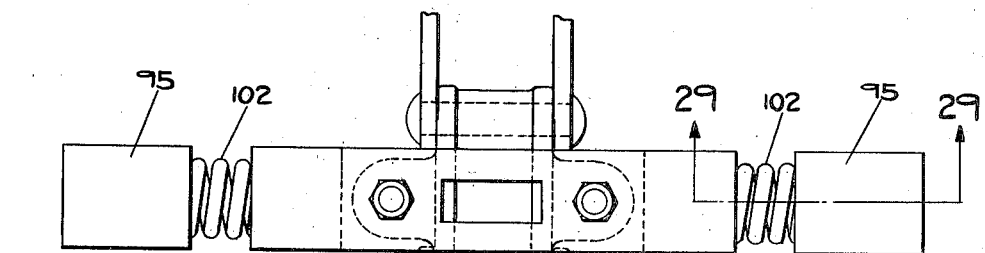
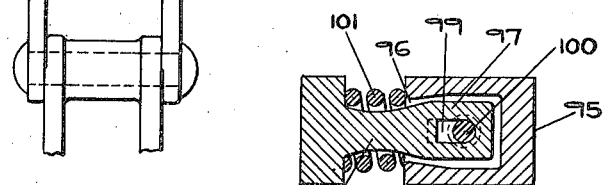
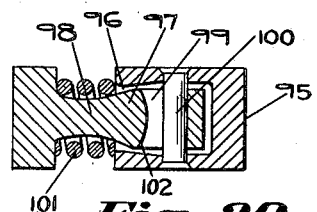
INVENTOR:
Edwin B. Gellatly,
BY
Chas. M. Nissen,
ATTY.

Patented Oct. 5, 1937

2,094,789

UNITED STATES PATENT OFFICE 2,094,789

CONVEYER FLIGHT

Edwin B. Gellatly, Pittsburgh, Pa., assignor to The Jeffrey Manufacturing Company, a corporation of Ohio Application July 12, 1934, Serial No. 734,796

16 Claims. (Cl. 198—171)

This invention relates to conveyers of the chain scraper type and particularly to an improved flight construction for said conveyers.

One of the objects of my invention is the provision in a transverse flight of a chain scraper conveyer, of means permitting such flight to yield when meeting an obstruction on the flight bed or way and thereby protect the traveling elements of the conveyer and prevent breakage thereof.

Another object of the invention is to provide a conveyer flight with a flexible link between the conveyer chain and the tips or shoes of said flight.

A further object of the invention is to provide a conveyer flight made principally of flexible material, such as rubber.

Other objects of the invention will appear hereinafter, the novel features and combinations being set forth in the appended claims.

Referring to the drawings:

Fig. 1 is a broken plan view of a sectional conveyer embodying my invention;

Fig. 2 is a broken elevational view of the conveyer trough of Fig. 1;

Fig. 3 is a section on the line 3—3 of Fig. 1, looking in the direction of the arrows;

Fig. 4 is a plan view of the preferred form of my improved flight;

Fig. 5 is a rear elevation of the flight shown in Fig. 4, illustrated as attached to a winged chain link;

Fig. 6 is a plan view of an assembly, showing two flights attached to a chain section;

Fig. 7 is a section on line 7—7 of Fig. 4, looking in the direction of the arrows;

Fig. 8 is a section on line 8—8 of Fig. 4, looking in the direction of the arrows;

Fig. 9 is a front elevational view of a modified form of my invention;

Fig. 10 is a plan view of the device of Fig. 9;

Fig. 11 is an end view of the device of Figs. 9 and 10;

Fig. 12 is a front elevation of another modified form of my invention;

Fig. 13 is a plan view of the device of Fig. 12;

Fig. 14 is a perspective view of the shoe or tip employed in each of the embodiments of my invention as illustrated by Figs. 4, 5, 9, 10, 12 and 13;

Fig. 15 is a perspective view of the central bracket of the form of my invention illustrated in Figs. 12 and 13;

Fig. 16 is a sectional view taken on the line 16—16 of Fig. 15, looking in the direction of the arrows;

Fig. 17 is a sectional view taken on the line 17—17 of Fig. 12, looking in the direction of the arrows;

Fig. 18 is a plan view of another modified form of my invention, illustrated as attached to a chain;

Fig. 19 is an elevational and section view of the device of Fig. 18, taken along the line 19—19 of Fig. 18 looking in the direction of the arrows;

Fig. 20 is a plan view of another modified form of my invention, illustrated as attached to a chain;

Fig. 21 is an elevational and sectional view of the device of Fig. 20, taken along the line 21—21 of Fig. 20 looking in the direction of the arrows;

Fig. 22 is an elevational view of another modified form of my invention, illustrated attached to a wing type chain link;

Fig. 23 is a plan view of the device of Fig. 22;

Fig. 24 is an elevational view of another modified form of my invention, illustrated attached to a wing type chain link;

Fig. 25 is a plan view of the device of Fig. 24;

Fig. 26 is a sectional view taken on the line 26—26 of Fig. 25, looking in the direction of the arrows;

Fig. 27 is an elevational view of another modified form of my invention, illustrated attached to a chain;

Fig. 28 is a plan view of the device of Fig. 27 including the chain;

Fig. 29 is a sectional view taken on the line 29—29 of Fig. 28; and

Fig. 30 is a sectional view taken on the line 30—30 of Fig. 27.

Referring particularly to the drawings, there is illustrated in Fig. 1 a scraper conveyer of the sectional, single-strand chain type embodying my invention. This type of a conveyer is employed primarily for surface conveying and is particularly useful in coal mines for conveying coal from a wall of the mine to a position to be hauled away. The conveyer trough 39 comprises a head end 40 and a tail end 41. Adjacent the head end and carried thereby, is a driving shaft 42 suitably journaled thereto, carrying a central chain sprocket 43. Adjacent the tail end is a shaft 44 suitably journaled in adjustable chain tightening bearings 45, 45, which shaft also carries a central chain sprocket, not shown. Between the head end 40 and the tail end 41 are any desired number of trough sections which, with said head and tail ends, form the complete trough 39. Between the sprocket 43 carried at the head end and the sprocket carried at the tail end there extends a continuous draft chain 46 carrying lateral flights 47 at predetermined intervals. When the chain 46 is moved in the direction indicated by the arrows in Fig. 1, any material in the trough is conveyed, particularly by the flights 46, to the head end where it is discharged. As illustrated in Fig. 1, suitable driving means is provided for driving chain 46, comprising an electric motor 48, reduction gearing 49 and sprocket and chain mechanism 50.

As best seen in Fig. 3, the conveyer trough 39 is provided with sloping side walls 51, 51 and a bottom wall 52. Extending below the bottom wall 52 are laterally spaced, longitudinally disposed angle members 53, 53 which form a return guide and support for the chain 44 and flights 47. The metal shoes or tips of the flights are adapted to ride in the tracks formed by angle members 53, 53 in their return movement on chain 46 thus supporting said chain.

In conveyers of the type indicated generally in Figs. 1, 2 and 3, in which the flights have been made of a rigid material, as an iron forging, and have been rigidly attached to the chain 46, certain difficulties have been encountered due to the breaking or bending of the flights and the breaking of the conveyer chain. A bent flight may tend to lift the chain 46 from the bottom of the trough 52, may seriously interfere with the proper return movement of the flights along channels 53, 53, or may be objectionable in numerous other respects.

It has been found that in actual practice rigid flights, or rigidly connected flights, often become bent or broken due to numerous reasons, such as the improper alignment of sections, binding of coal or other particles beneath the chain or at a section joint, and from various other causes.

My improved flight construction, removes this undesirable feature by making the flight flexible or by making a flexible link somewhere between the metal flight tips or shoes and the chain link to which the flight is attached. In this way, any unusual load on the flight will merely result in a temporary deflection thereof to remove the strain, after which the flight will assume its normal position. This has been found to improve the efficiency of operation of the conveyer by decreasing the number of "shut-downs" in a period of operation. It also increases the life thereof by decreasing the wearing of the chain pin holes. In present known devices, said chain pin holes wear rapidly due to surges created by the uneven load on the conveyer caused by binding or catching of a flight, as above mentioned with its subsequent release.

With my improved flight construction, not only are "shut-downs" reduced but the chains can be used much longer for they may be worn at their pin holes to a greater degree without breaking, due to the elimination of the above mentioned surges.

In its preferred form, the flight comprises a central body portion made of flexible material having a top plate 54 and having side plates 55 formed integral therewith. In its normal position, the top plate 54 is in a horizontal plane while the side plates 55 are set at an angle with respect thereto. This is best seen in Fig. 7. Integral reinforcing ribs are provided at 56 to strengthen the connection between the top plate 54 and side plates 55, on the forward side thereof. Where the side plates 55 join said top plate 54, they form thickened center portions, which are provided with grooves 56', 56' for the reception of the wings 57, 57 of a winged chain link 58. These thickened portions are also cupped at 59, 59 to provide a space for the nuts 60, 60 attached to bolts 61, 61 extending through suitable openings in the top plate 54, wings 56, 56 and bosses 62, 62 of said thickened portions. To insert the wings 57, 57 into the recesses 56', 56', the center plate 54 is deflected into a U shape with the recesses 56', 56' on the outside thereof. The top plate 54 is provided with a central opening 63 to prevent any binding between a sprocket tooth and the top plate due to any coal particles being caught in the chain link under said top plate. The rear face of each of the side plates 55, 55 is preferably provided with reinforcing webs 64, 64 which are integral therewith and extend to the bosses 62, 62, as do the forward ribs 56, 56. Adjacent the outer ends of the side plates 55 and rigidly attached thereto, are the shoes or tips 65, 65.

As best seen in Fig. 14, the metal shoes or tips 65, 65 are each provided with a boss 66 at the top and outer portion thereof present a wearing and supporting surface 67 for supporting the chain during its return movement, as best illustrated in Fig. 3. The shoes or tips 65, 65 are also provided with anchor extensions 68 with apertures 69 adapted to be filled by rubber pins formed therein, as best illustrated in Fig. 17, during the process of molding the body of the flight, comprising the top plate 54 and side plates 55, as well as the other constituent parts of said body, as above mentioned, to the shoes or tips 65. As above indicated, the body of the flight is preferably made of molded rubber, which is sufficiently rigid to move material along the bottom surface 52 of the trough and to support the chain 46 on its return movement, but which is sufficiently elastic to deflect temporarily under abnormal load; for example, when a shoe or tip 65 abuts a trough section at a joint.

As best illustrated in Fig. 5, the side plates 55 preferably have their lower faces terminating slightly above the bottom face 52 of the trough. This prevents undue friction between said side plates 55 and said bottom face 52 and allows the bottom of the shoes or tips 65 and the bottom of the chain links 58 to rest on the bottom face 52 during operation of said conveyer.

As best illustrated in Fig. 6, during the normal movement of the chain 46 and its flights 47, in the direction indicated by the arrow, the side plates 55 are sloping at an angle with respect to the trough bottom wall 52 and make an obtuse angle therewith. It is to be understood, however, that the chain may be driven in a reverse direction as by reversing the direction of rotation of the driving motor.

In Figs. 9, 10 and 11 of the drawings, I have illustrated a slight modification of the preferred form of my invention. In this modification thereof, the reinforcing ribs 56, 56 and 64, 64 of the preferred form have been omitted. Likewise the bosses 62, 62 have been omitted. This provides a somewhat lighter and less rigid construction and where the material to be handled and the chain weight are not excessive, it may be employed instead of the preferred form.

In Figs. 12, 13, 15, 16 and 17, I have illustrated another form of my invention. In this form, the flight comprises a central piece 70 of metal, as an iron forging, having substantially the same configuration as the central portion of the flight shown in Figs. 9, 10 and 11. This central piece 70 is provided with opposite anchor extensions 71, 71 similar in configuration to the anchor extensions 68, 68 of the shoes or tips 65.

The shoes or tips 65, 65 are flexibly attached to the central portion 70, in this form, by the flexible side plates 72, 72 preferably made of rubber molded about the anchor extensions 68, 68 and 71, 71. The rubber side plates 72, 72 will therefore provide a flexible link between the shoes or tips 65, 65 and the chain to which the flight is attached. As indicated in Fig. 12, the bottom wall of each side plate 72 terminates just short of the bottom wall of the attached shoe or tip 65 and of the bottom wall of the center piece 70. The molded side plates are, of course, attached to the anchor extensions 68, 68 and 71, 71 by virtue of the integrally formed rubber fillings in the apertures of said anchor extensions.

In Figs. 18 and 19, I have illustrated another form of my invention in which the flight 47 is of rigid material and may comprise an iron forging. Said flight has the same general configuration as the flexible flight of Figs. 9, 10 and 11. To provide a flexible link between the chain and flight, I employ an inverted U-shaped bracket 73 having a top wall 74 and side walls 74, 74, formed of some elastic material, such as rubber. The bracket 74 must have sufficient rigidity to properly carry the flight 47 when under normal load and sufficient elasticity or flexibility to allow both vertical and horizontal movement of said flight with respect to the chain link 75. The top wall of the bracket 74 may be attached to the flight 47 by nuts and bolts 76, 76, and the side walls 74, 74 thereof may be attached to a chain link by nuts and bolts 77, 77.

In Figs. 20 and 21, I have illustrated another form of my invention. As is readily seen, this form is essentially the same as that of Figs. 18 and 19 except for the U-shaped bracket 74 thereof. I employ a pair of flexible angle members 78, 78, preferably made of rubber, for attaching the flight 47 to a chain link.

While in the forms of my invention as seen in Figs. 18, 19, 20 and 21, I have illustrated the flight 47 as formed of rigid material, it is to be distinctly understood that this is by no means essential. If greater flexibility is desired, I may employ any of the flight structures of the forms illustrated in Figs. 4, 5, 6, 7, 8; Figs. 9, 10, 11; Figs. 12, 13; Figs. 22, 23; Figs. 24, 25, 26 or Figs. 27, 28, 29, 30 in place of said rigid flights.

In Figs. 2 and 23, I have illustrated another form of my invention. In this form, the flight comprises an inverted U-shaped center member 79 the top wall 80 of which is provided with an opening 81 and the side walls 82 of which are provided with laterally extending lugs 83, 83. The shoes or tips 84, 84 are provided with laterally extending lugs 85, 85. Between the lugs 83, 83 and 85, 85, extend flexible connecting links 86, 86, which may take the form of metallic leaf springs, or they may be made of rubber or rubber compound. Said links 86, 86 are held between lugs 83, 83 and 85, 85 by nuts and bolts 87, 87 providing for the replacement of said links 86, 86. It may be noted that in this form of my invention the flight shoes or tips 84, 84 are of slightly different configuration from that previously illustrated in that they are substantially square in transverse cross section.

In Figs. 24, 25 and 26, I have illustrated another form of my invention. In this form, the flight has the same general construction as illustrated in Figs. 22 and 23. However, certain differences are obvious. The center member 88 is provided at each end with an integral ball 89 carried at the end of an integral neck 90. The balls 89, 89 are adapted to be carried in sockets 91, 91 formed in the two-piece shoes or tips 92, 92 formed of upper and lower dished plates held together, as by rivets 93, 93. Coil springs 94, 94 are adapted to be carried about necks 90, 90 and bear against the opposed walls of the center member 88 and the shoes or tips 91, 91 respectively. The coil springs 94, 94 may have an inside diameter slightly less than the diameter of balls 89, 89, but can be expanded to slide thereover while being placed about necks 90, 90.

In Figs. 27, 28, 29 and 30, I have illustrated another form of my invention. In general, this form is substantially the same as that illustrated in Figs. 24, 25 and 26. However, in this case, the shoes or tips 95, 95 are made of one piece and have openings 96 sufficiently large to receive the head 97 of the integral extension 98. Said head 97 is provided with a transverse slot 99 adapted to receive a pin 100 riveted at its ends to the shoe or tip 95. The slot 99 provides an arcuate surface at 102 to allow free pivotal movement of the shoe or tip 95 about a horizontal axis. A coil spring 101 surrounds the neck of extension 98 and abuts opposed walls of the center piece and shoe respectively.

Obviously those skilled in the art may make various changes in the details and arrangement of parts without departing from the spirit and scope of the invention as defined by the claims hereto appended, and I wish therefore not to be restricted to the precise construction herein disclosed.

Having thus described and shown an embodiment of my invention, what I desire to secure by Letters Patent of the United States is:

1. In a conveyer, the combination with a trough adapted to receive and guide material to be conveyed, of a draft chain adapted to move longitudinally with respect to said trough centrally thereof, a flight having metal tips and an intermediate part which is of rubber material and which is adapted to move in said trough, and means attaching said flight to said chain.

2. A conveyer flight comprising a central body portion adapted to be attached to a chain, a pair of wearing shoes adjacent the ends of said flight, and flexible rubber means connecting said wearing shoes and said central body portion, said wearing shoes having their bottoms extending below said flexible rubber means to prevent said flexible rubber means from contacting the surface over which the flight moves when in operation.

3. A conveyer flight comprising a central body portion adapted to be attached to a chain, a pair of wearing shoes adjacent the ends of said flight, and flexible rubber means connecting said wearing shoes and said central body portion.

4. A conveyer flight comprising means for attachment to a chain link, a pair of wearing shoes adjacent the ends of said flight, and means made of flexible material connected intermediate said shoes and said attaching means.

5. A conveyer flight comprising a central body portion adapted to be attached to a chain, a pair of wearing shoes adjacent the ends of said flights, side plates connecting said shoes and said central body, said central body and side plates being formed of flexible rubber.

6. A conveyer flight comprising a central body portion adapted to be attached to a chain, a pair of wearing shoes adjacent the ends of said flight, side plates connecting said shoes and said central body, said central body and side plates being formed of flexible rubber, and integral reinforcing ribs between said side plates and said central body.

7. A conveyer flight comprising a rigid central body portion adapted to be attached to a chain, a pair of wearing shoes adjacent the ends of said flight, and flexible rubber side plates connecting said shoes and said central body.

8. A conveyer flight comprising a rigid central body portion adapted to be attached to a chain, a pair of wearing shoes adjacent the ends of said flight, and flexible means connecting said shoes and said central body.

9. A conveyer flight comprising a rigid central body portion adapted to be attached to a chain, a pair of wearing shoes adjacent the ends of said flight, and flexible metallic means connecting said shoes and said central body.

10. In a conveyer, the combination with a trough adapted to receive and guide material to be conveyed, of a chain adapted to move in said trough and longitudinally thereof, said chain being constructed to have little lateral flexibility, a flight having a body connected at its center portion to said chain and extending to each side thereof in said trough, said flight having wearing shoes adjacent its ends adapted to ride in the trough, and flexible means forming part of the flight body and interposed between said chain and said shoes whereby the shoes may deflect temporarily when met by an obstruction, said flexible means comprising rubber.

11. In a conveyer, the combination with a trough adapted to receive and guide material to be conveyed, of a chain adapted to move in said trough and longitudinally thereof, said chain being constructed to have little lateral flexibility, a flight having a body connected at its center portion to said chain and extending to each side thereof in said trough, said flight having wearing shoes adjacent its ends adapted to ride in the trough, and flexible means forming part of the flight body and interposed between said chain and said shoes whereby the shoes may deflect temporarily when met by an obstruction.

12. In a conveyer, the combination with a trough adapted to receive and guide material to be conveyed, of a chain adapted to move in said trough and longitudinally thereof, said chain being constructed to have little lateral flexibility, a flight having a body connected at its center portion to said chain and extending to each side thereof in said trough, said flight having wearing shoes adjacent its ends adapted to ride in the trough, and flexible means forming part of the flight body and interposed between said chain and said shoes whereby the shoes may deflect temporarily when met by an obstruction, said flexible means comprising rubber, the bottom surface of which is spaced above the trough bottom by the wearing shoes and chain.

13. In a conveyer, the combination with a trough adapted to receive and guide material to be conveyed, of a chain adapted to move in said trough and longitudinally thereof, said chain being constructed to have little lateral flexibility, a flight having a body connected at its center portion to said chain and extending to each side thereof in said trough, said flight having wearing shoes adjacent its ends adapted to ride in the trough, and flexible means forming part of the flight body and interposed between said chain and said shoes whereby the shoes may deflect temporarily when met by an obstruction, said flexible means having its bottom surface spaced above the trough bottom by the wearing shoes and chain.

14. A conveyer flight comprising a central body portion adapted to be attached to a chain, a pair of wearing shoes adjacent the ends of said flight, side plates connecting said shoes and said central body, said side plates being formed of flexible rubber material.

15. In a conveyer, the combination with a trough adapted to receive and guide material to be conveyed, of a chain adapted to move in said trough and longitudinally thereof, a flight having a body connected at its center portion to said chain and extending to each side thereof in said trough, said flight having metal wearing shoes adjacent its ends adapted to ride in the trough, and flexible laterally extending side plates forming part of the flight body and interposed between the central portion thereof and said shoes whereby the shoes may be deflected temporarily when met by an obstruction, said flexible plates comprising rubber and being spaced above the trough bottom by said wearing shoes and chain.

16. In a conveyer, the combination with a trough adapted to receive and guide material to be conveyed, of a chain adapted to move in said trough and longitudinally thereof, a flight having a body connected at its center portion to said chain and extending to each side thereof in said trough, said flight having metal wearing shoes adjacent its ends adapted to ride in the trough, and flexible laterally extending side plates forming part of the flight body and interposed between the central portion thereof and said shoes whereby the shoes may be deflected temporarily when met by an obstruction, said flexible plates comprising rubber.

EDWIN B. GELLATLY.